H. G. DAYTON.
Disinfecting and Perfuming Apparatus.
No. 150,835. Patented May 12, 1874.
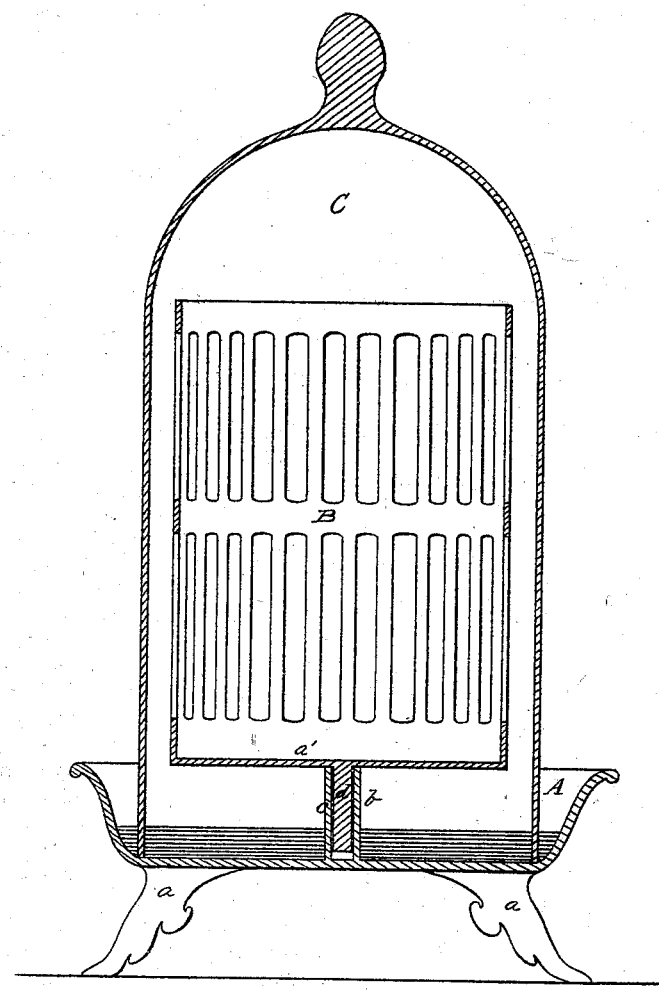
WITNESSES
George E. Upham
Robert Everett
INVENTOR
Henry G. Dayton
By Chipman an Hosmer & Co.
Attorneys

UNITED STATES PATENT OFFICE.

HENRY G. DAYTON, OF MAYSVILLE, KENTUCKY, ASSIGNOR OF ONE-HALF HIS RIGHT TO ELLIOTT P. GLEASON, OF NEW YORK CITY.

IMPROVEMENT IN DISINFECTING AND PERFUMING APPARATUS.

Specification forming part of Letters Patent No. 150,835, dated May 12, 1874; application filed April 11, 1874.

*To all whom it may concern:*

Be it known that I, HENRY G. DAYTON, of Maysville, in the county of Mason and State of Kentucky, have invented a new and valuable Improvement in Disinfecting and Perfuming Apparatus; and I do hereby declare that the following is a full, clear, and exact description of the construction and operation of the same, reference being had to the annexed drawings making a part of this specification, and to the letters and figures of reference marked thereon.

Figure 1 of the drawing is a representation of a sectional view of my device.

This invention has relation to means for disinfecting sick-rooms and other places at will, and at the same time preserving the volatile material when not required for diffusion about the room. This invention is especially advantageous in the use of carbolic acid, which is very subtile and diffusive in its nature, needing only to be exposed a short time to produce a desirable effect, but too strong for a lengthened exposure under ordinary circumstances.

In the accompanying drawings, the letter A designates a base-pan, preferably supported upon legs $a$ for the purpose of keeping its under surface from the table-cloth or other surface upon which it may be placed. This pan is designed to hold water and to form in connection with a cover, hereinafter described, a water-seal. B represents a rotating or other cage, having its base, $a'$, above the water-line usually, and slotted or perforated through its side wall to permit the free passage outward of the particles of disinfecting or perfuming substance, and to assist in creating currents of air about the cage during its rotation. The cage is rotated preferably upon its vertical axis, the journal $b$ being arranged under the base of the cage. This may be constructed by providing a vertically-projecting post or sleeve, $c$, secured to the center of the base-pan and extending upward a short distance, forming a pivot or pivot-socket, as the case may be, for a sleeve or pivot, $d$, attached to the under side of the bottom of the cage. In this manner the cage is made removable for cleansing purposes. Within this cage the fumigating, disinfecting, or perfuming material, conveniently held by absorption in a sponge, is placed. In this way it is located above the water-level, and when the cage is rotated fresh currents of air are created and brought in contact with the substance carrying its fumes or vapors off with great rapidity. C represents a dome or cover, of sufficient size and height to envelope the cage and its contents, and of the proper diameter at its lower end or mouth to descend within the side wall or flange of the pan A into the water contained in said pan, thus forming a water-seal, whereby, when it is desired, the fumes or vapors of the disinfecting or perfuming material may be hermetically inclosed and prevented from diffusion. The amount of air within the cover will now become thoroughly saturated with the vapors, until no more can be taken up, and may be kept for any length of time in this state, ready, upon the removal of said cover, to be thrown into the surrounding atmosphere instantaneously, and without waiting for the slower process of evaporation.

What I claim as new is—

The combination, with a pan, A, and cover C for a water-seal, of a cage supported above said pan within said cover for holding volatile material, substantially as specified.

In testimony that I claim the above I have hereunto subscribed my name in the presence of two witnesses.

HENRY G. DAYTON.

Witnesses:
FRANK J. MASI,
GEORGE E. UPHAM.